United States Patent
Little (10) Patent No.: US 10,260,643 B2
(45) Date of Patent: Apr. 16, 2019

(54) BLEED VALVE RESONATOR DRAIN (71) Applicant: United Technologies Corporation, Farmington, CT (US)

(72) Inventor: Jonathan D. Little, West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 592 days.

(21) Appl. No.: 14/944,996

(22) Filed: Nov. 18, 2015

(65) Prior Publication Data

US 2016/0153311 A1 Jun. 2, 2016

Related U.S. Application Data (60) Provisional application No. 62/086,219, filed on Dec. 2, 2014.

(51) Int. Cl.
F02C 6/08 (2006.01)
F02C 9/18 (2006.01)
F04D 27/02 (2006.01)
F04D 29/32 (2006.01)
F04D 29/66 (2006.01)
(Continued)

(52) U.S. Cl.
CPC ............... F16K 3/24 (2013.01); F02C 6/08 (2013.01); F02C 9/18 (2013.01); F04D 27/023 (2013.01); F04D 27/0215 (2013.01); F04D 29/321 (2013.01); F04D 29/665 (2013.01); F04D 29/706 (2013.01); F05D 2220/32 (2013.01); F05D 2260/602 (2013.01); F05D 2260/605 (2013.01); F05D 2260/96 (2013.01)

(58) Field of Classification Search
CPC .......... F02C 6/08; F02C 9/18; F04D 27/0215; F04D 27/023; F04D 29/665; F04D 29/706; F05D 2220/32; F05D 2220/321; F05D 2220/3216; F05D 2220/3217; F05D 2220/3218; F05D 2220/3219; F05D 2260/602; F05D 2260/605; F05D 2260/96; F16K 3/24; Y10T 137/2544; Y10T 137/7303; Y10T 137/86324; Y10T 137/86332
USPC ................. 137/102, 391, 587, 588
See application file for complete search history.

(56) References Cited

U.S. PATENT DOCUMENTS 2,451,154 A * 10/1948 Davis, Jr. ............ G01F 13/00
                                                251/49
2,837,270 A *  6/1958 Chapman ......... F04D 27/0215
                                                415/145
(Continued)

FOREIGN PATENT DOCUMENTS

EP         0550127         7/1993

OTHER PUBLICATIONS

The Extended European Search Report for European Application No. 15197306.2, dated Apr. 29, 2016.

Primary Examiner — Igor Kershteyn
Assistant Examiner — Christopher R Legendre
(74) Attorney, Agent, or Firm — Carlson, Gaskey & Olds, P.C.

(57) ABSTRACT

A bleed valve includes a valve body which includes an aperture. A resonator is in fluid communication with the aperture in the valve body. A drain valve is in fluid communication with the resonator.

9 Claims, 7 Drawing Sheets (51) Int. Cl.
    *F04D 29/70*     (2006.01)
    *F16K 3/24*     (2006.01)

(56) References Cited

U.S. PATENT DOCUMENTS

| | | | |
|---|---|---|---|
| 3,909,152 A * | 9/1975 | Rannenberg | F04D 27/0215 |
| | | | 137/484 |
| 4,546,605 A * | 10/1985 | Mortimer | F01D 17/105 |
| | | | 184/6.11 |
| 5,159,808 A * | 11/1992 | Kast | F02C 7/236 |
| | | | 60/39.091 |
| 6,106,227 A | 8/2000 | Honda et al. | |
| 6,622,475 B2 * | 9/2003 | Brault | F01D 17/105 |
| | | | 60/226.3 |
| 6,640,544 B2 | 11/2003 | Suenaga et al. | |
| 6,955,053 B1 | 10/2005 | Chen et al. | |
| 7,272,931 B2 | 9/2007 | Held et al. | |
| 7,549,506 B2 | 6/2009 | Sattinger | |
| 7,722,316 B2 | 5/2010 | Scarinci et al. | |
| 7,856,830 B2 | 12/2010 | Alkabie | |
| 7,942,625 B2 | 5/2011 | Sirakov et al. | |
| 8,024,935 B2 * | 9/2011 | Hoover | F01D 17/105 |
| | | | 60/226.1 |
| 8,272,834 B2 | 9/2012 | Lefevre | |
| 8,567,197 B2 | 10/2013 | Mueller et al. | |
| 2013/0206500 A1 | 8/2013 | Ono et al. | |
| 2013/0283799 A1 | 10/2013 | Carey et al. | |
| 2014/0020975 A1 | 1/2014 | Konig | |
| 2016/0153311 A1 * | 6/2016 | Little | F04D 29/321 |
| | | | 415/1 |
| 2016/0153361 A1 * | 6/2016 | Morin | F02C 3/13 |
| | | | 137/343 |

\* cited by examiner

BLEED VALVE RESONATOR DRAIN

CROSS-REFERENCE TO RELATED APPLICATIONS

This application claims priority to U.S. Provisional Application No. 62/086,219, which was filed on Dec. 2, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

During certain operating conditions for the gas turbine engine, it may be advantageous to bleed compressor air off of the compressor section through a bleed duct by opening a bleed valve. In particular, bleeding air from the compressor section can reduce instability in the compressor section that may result from surges in pressure. However, air flowing across the bleed duct when the bleed valve is closed may create a resonance in the bleed duct. The resonance could cause vibrational waves to travel through compressor blades adjacent the bleed duct resulting in unwanted stress on the compressor blades. Therefore, there is a need to prevent the formation of vibrational waves traveling through the bleed duct when the bleed valve is closed.

SUMMARY

In one exemplary embodiment, a bleed valve includes a valve body which includes an aperture. A resonator is in fluid communication with the aperture in the valve body. A drain valve is in fluid communication with the resonator.

In a further embodiment of the above, the drain valve includes a body portion that at least partially surrounds a slider.

In a further embodiment of any of the above, the slider is configured to move in an axial direction.

In a further embodiment of any of the above, there is a spring for biasing the slider relative to the body portion.

In a further embodiment of any of the above, the slider includes an engagement portion for engaging a static structure on a gas turbine engine.

In a further embodiment of any of the above, the slider includes a seal portion that includes at least one O-ring for selectively opening an aperture in the resonator.

In a further embodiment of any of the above, the valve body is located radially inward from the resonator.

In another exemplary embodiment, a gas turbine engine includes a compressor section. A bleed duct is in communication with the compressor section. A bleed valve is in communication with the bleed duct which includes an aperture in a valve body. A resonator is in fluid communication with the aperture and a drain valve is in fluid communication with the resonator.

In a further embodiment of any of the above, the bleed valve is a 2.5 bleed valve for a gas turbine engine.

In a further embodiment of any of the above, the bleed valve is located adjacent an aft stage of a low pressure compressor.

In a further embodiment of any of the above, the drain valve includes a body portion that at least partially surrounds a slider.

In a further embodiment of any of the above, the slider is configured to move in an axial direction.

In a further embodiment of any of the above, there is a spring for biasing the slider relative to the body portion.

In a further embodiment of any of the above, the slider includes an engagement portion for engaging a static structure on a gas turbine engine.

In a further embodiment of any of the above, the slider includes a seal portion including at least one O-ring for selectively opening an aperture in the resonator.

In a further embodiment of any of the above, the bleed valve is located radially inward from the resonator.

In another exemplary embodiment, a method of operating a gas turbine engine includes bleeding compressed air through a bleed duct, counteracting a resonant frequency with a resonator adjacent the bleed duct and draining a fluid from the resonator through a drain valve.

In a further embodiment of any of the above, the drain valve includes a body portion at least partially surrounding a slider with the slider configured to move in an axial direction.

In a further embodiment of any of the above, there is a spring for biasing the slider relative to the body portion.

In a further embodiment of any of the above, the slider includes an engagement end for engaging a static structure on the gas turbine engine.

DETAILED DESCRIPTION

Figure 1:
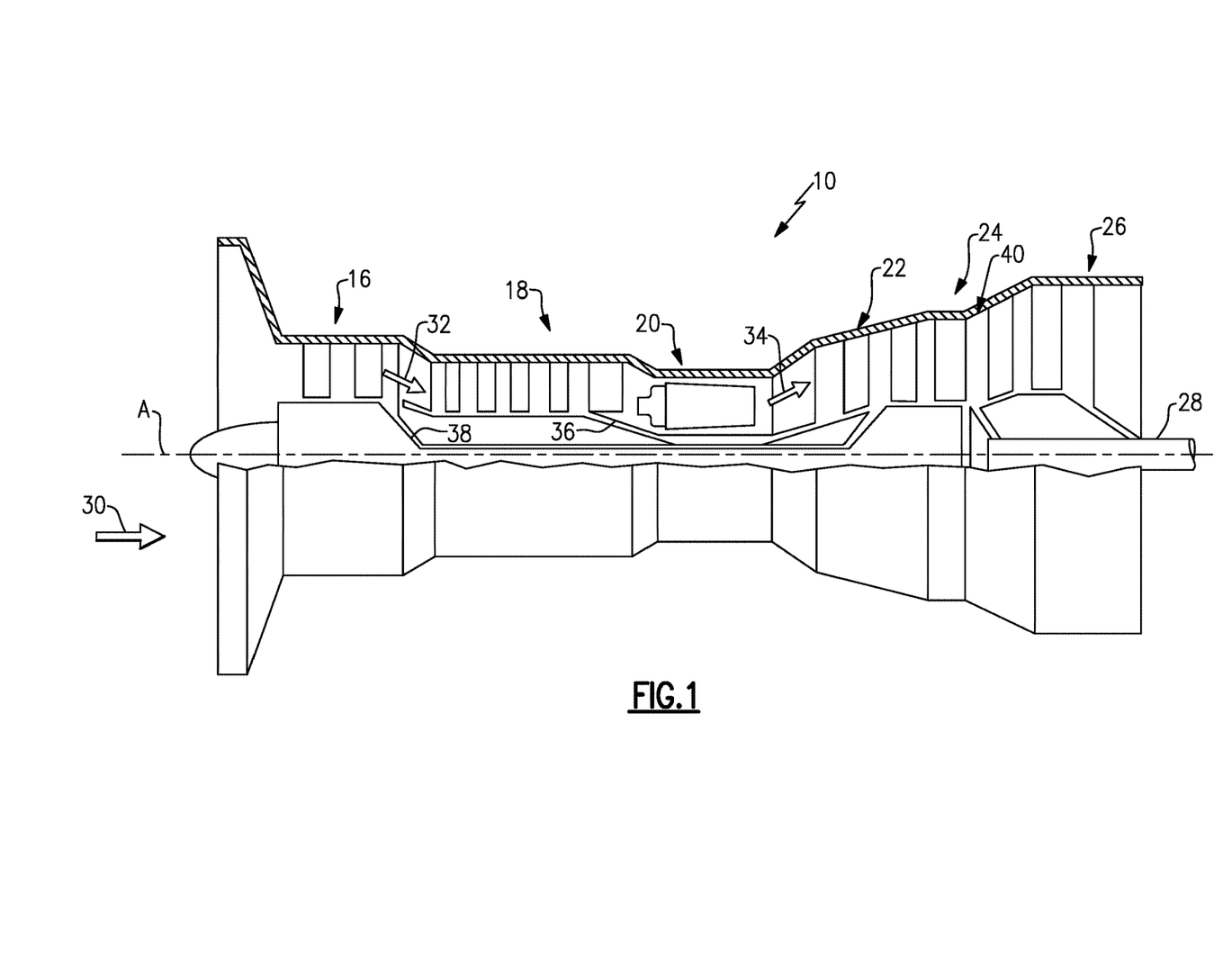
FIG. 1 shows a schematic view of an example gas turbine engine.

FIG. 1 illustrates a schematic view of a gas turbine engine 10. In the illustrated example, the gas turbine engine 10 is an industrial gas turbine engine circumferentially disposed about a central, longitudinal engine axis A. In this disclosure, radial or radial direction is relative to the engine axis A unless otherwise specified.

Figure 2:
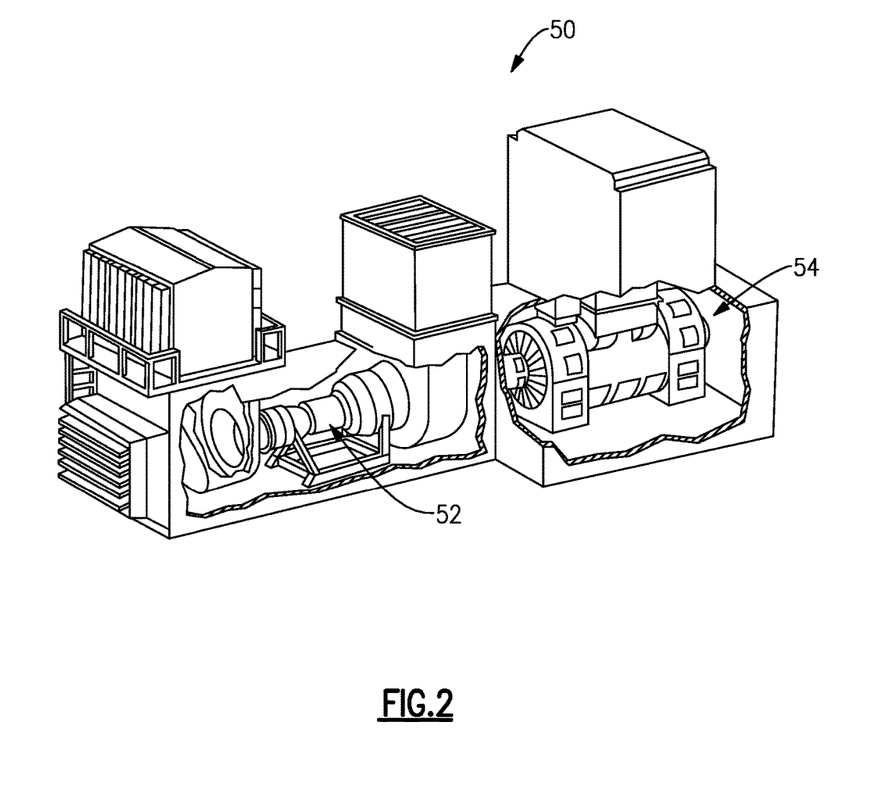
FIG. 2 shows an example industrial gas turbine engine with a generator.

The gas turbine engine 10 includes, in series order from an axial front to an axial rear, a low pressure compressor section 16, a high pressure compressor section 18, a combustor section 20, a high pressure turbine section 22, and a low pressure turbine section 24. In the illustrated embodiment, a power turbine section 26 is a free turbine section disposed aft of the low pressure turbine 24 and drives a power turbine drive shaft 28 (FIG. 2).

Incoming ambient air 30 entering the gas turbine engine 10 becomes pressurized air 32 in the low pressure compressor 16 and the high pressure compressor 18. Fuel mixes with the pressurized air 32 in the combustor section 20 prior to ignition and combustion of the fuel. Once the fuel has combusted, combustion gases 34 expand through the high pressure turbine section 22, the low pressure turbine section 24, and through the power turbine section 26. The high and low pressure turbine sections 22 and 24 drive high and low pressure rotor shafts 36 and 38, respectively, which rotate in response to the combustion products and thus rotate the attached high and low pressure compressors 18 and 16. The power turbine section 26 may, for example, drive an electrical generator 54, pump, or gearbox through the power turbine drive shaft 28 (FIG. 2).

A low pressure turbine exhaust case 40 is positioned between the low pressure turbine section 24 and the power turbine section 26. The turbine exhaust case 40 defines a flow path for gas exhausted from low pressure turbine section 24 that is conveyed to power turbine 26. The turbine exhaust case 40 also provides structural support for the gas turbine engine 10.

A basic understanding and overview of the various sections and the basic operation of the gas turbine engine 10 is provided in FIG. 1. However, this disclosure is applicable to all types of gas turbine engines, including those with aerospace applications and industrial applications.

As shown in FIG. 2, an example industrial gas turbine engine assembly 50 including a gas turbine engine 52, such as the example gas turbine engine 10 described above, mounted to a structural land based frame to drive the electrical generator 54.

Figure 3:
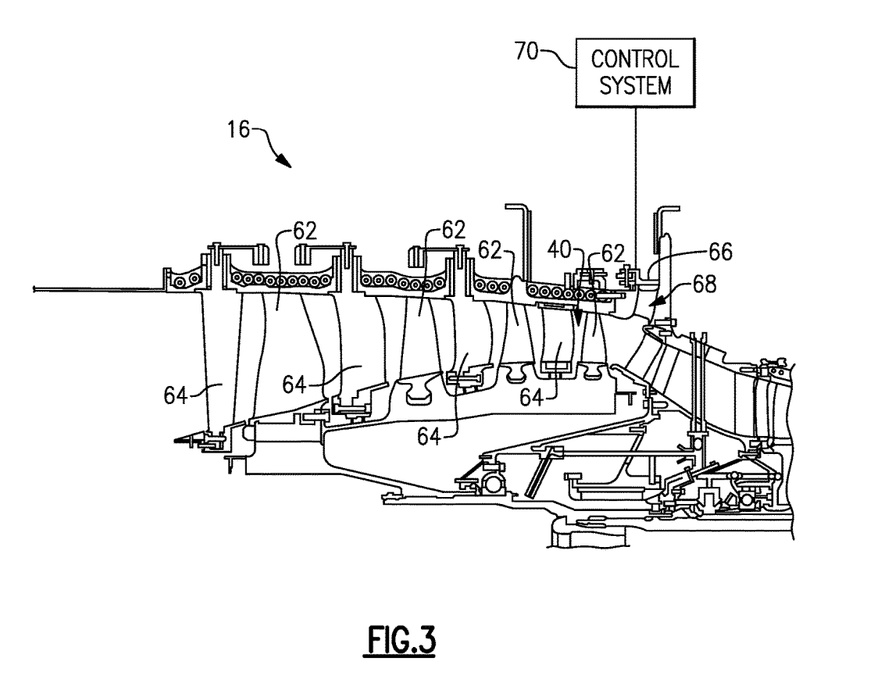
FIG. 3 shows a cross-section view of an example low pressure compressor.

FIG. 3 illustrates a cross-section view of the low pressure compressor 16. In the illustrated example, the low pressure compressor 16 includes a core flow path with four stages of rotating blades 62 separated from each other by vanes 64. A bleed valve 66 is located downstream or aft of a fourth stage blade 62. In the illustrated example, the bleed valve 66 is a 2.5 bleed valve. However, the bleed valve 66 may be located at a different position in the gas turbine engine 10.

The bleed valve 66 selectively directs a portion of the core flow path through a bleed duct 68 or the entire core flow path though the high pressure compressor 18. The bleed valve 66 selects between the bleed duct 68 and the high pressure compressor 18 depending instability of flow in the core flow path based on an operational state of the gas turbine engine 10, such during starting conditions, transient conditions, and reverse thrust conditions.

While the bleed valve 66 is closed, gases from the core flow path are prevented from exiting the core flow path through the bleed duct 68. Gases flowing across the bleed duct 68 may create a resonance in the bleed duct 68. The resonance may cause vibrational waves to travel axially forward and damage the blades 62 in the low pressure compressor 16 nearest the bleed duct 68. In the illustrated example, the blade 62 nearest the bleed duct 68 would be the fourth or aft most stage in the low pressure compressor 16. The frequency of the vibrational waves may be changed to prevent damage by altering the properties of the bleed duct 68, such as a length or volume of the bleed duct 68, or by incorporating a resonator.

The bleed valve 66 may be in communication with a compressor control system 70, such as a portion of the Electronic Engine Control ("EEC") for controlling stability of the low pressure compressor 16 during starting conditions, transient conditions, and reverse thrust conditions. The EEC is the primary interface with the power plant and includes communication with various systems, such as engine interference, vibration monitoring units, maintenance systems, and electronic instrument systems. The bleed valve 66 may be directed to open by the EEC to bleed fourth stage air out of the core flow path of the low pressure compressor 16 through the bleed duct 68.

Figure 4:
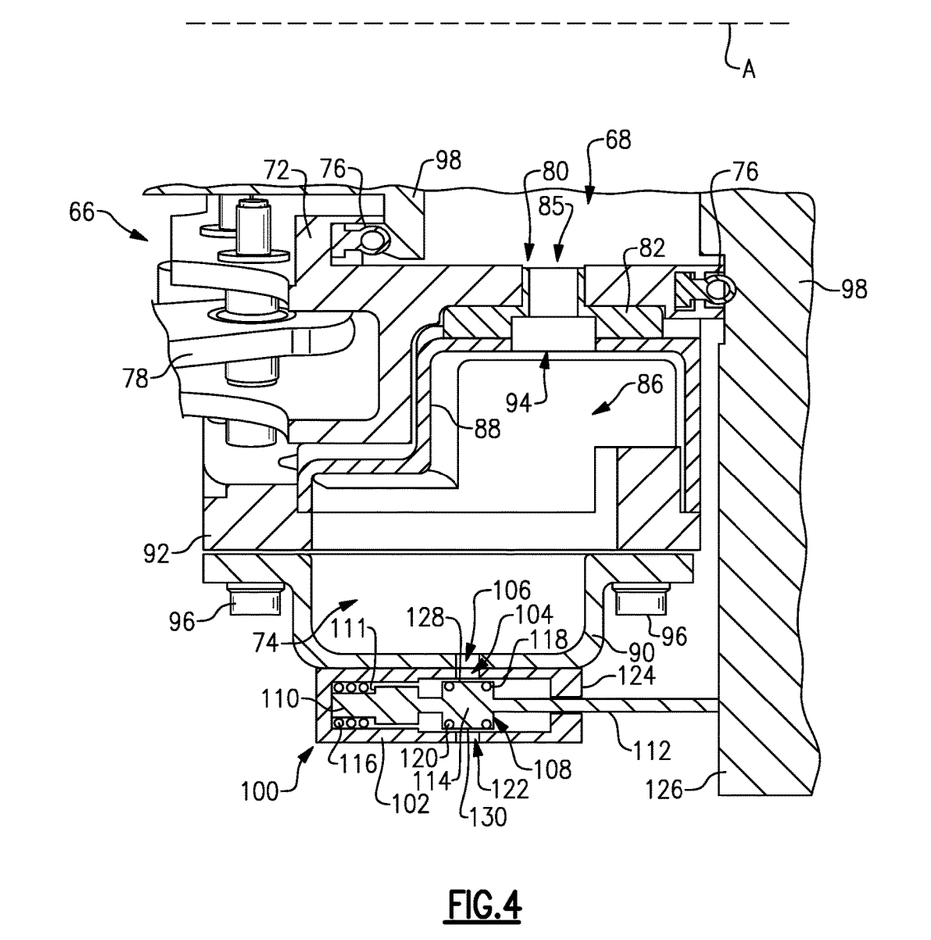
FIG. 4 shows a cross-section view of an example bleed valve.

FIG. 4 illustrates a cross-section view of the bleed valve 66. The bleed valve 66 includes a bleed valve body 72 and seals 76 that seal the bleed valve 66 relative to a low pressure compressor case 98. A resonator 74 is located adjacent the bleed valve 66 on a radially outer side of the bleed valve 66.

An actuator 78 may drive the bleed valve body 72 in an axially forward or upstream direction to release gases from the core flow path through the bleed duct 68 to reduce the amount of gases entering the high pressure compressor 18. The bleed valve body 72 includes a radially extending aperture 80 that receives a manifold 82. The manifold 82 is located on a radially outer side of the bleed valve body 72 and includes a collar portion 84 defining an aperture 85 that extends at least partially into the aperture 80 in the bleed valve body 72. Although only a single collar portion 84 is shown in the illustrated example, multiple collar portions 84 could be located on a single manifold 82 and the bleed valve body 72 could include a corresponding number of apertures 80 to receive the multiple collar portions 84.

The resonator 74 includes a resonating chamber 86 defined by a first resonator body portion 88 on a radially inner side, a second resonator body portion 90 on a radially outer side, and a third or intermediate resonator body portion 92 located radially between the first resonator body portion 88 and the second resonator body portion 90. The first, second, and third resonator body portions 88, 90, and 92 are secured together by fasteners 96. The first resonator body portion 88 includes an aperture 94 that is aligned with the apertures 80 and 85 so that the resonator 74 is in fluid communication with the bleed duct 68. The resonator 74 changes the acoustic properties of the bleed duct 68 to prevent the formation of a resonant frequency in the bleed duct 68.

Figure 5:
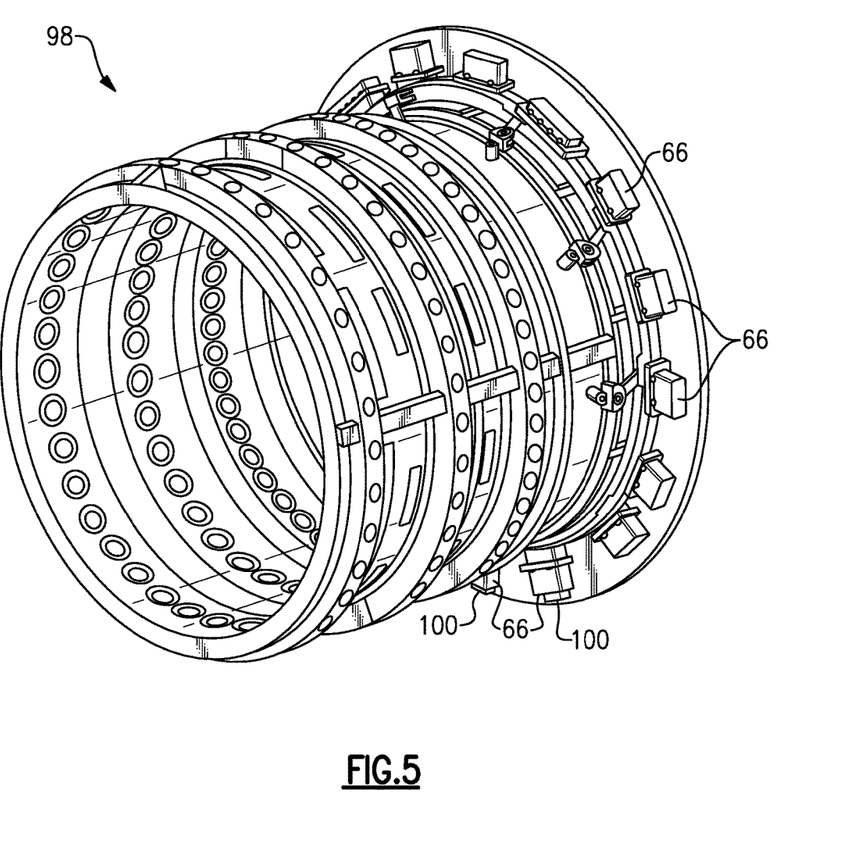
FIG. 5 shows a perspective view of an example low pressure compressor case.

In order to increase the efficiency of the gas turbine engine 10, it can be advantageous to inject water into the low pressure compressor 16 during operation. Any of the injected water that does not evaporate or travel into the high pressure compressor 18 will be left behind in the low pressure compressor 16. As shown in FIG. 5, the bleed valves 66 and resonators 74 are circumferentially spaced around an entire perimeter of the low pressure compressor case 98. Therefore, the injected water or water from another source may collect in the bleed valves 66 and the resonators 74 along the bottom portion of the low pressure compressor 16.

Figure 6:
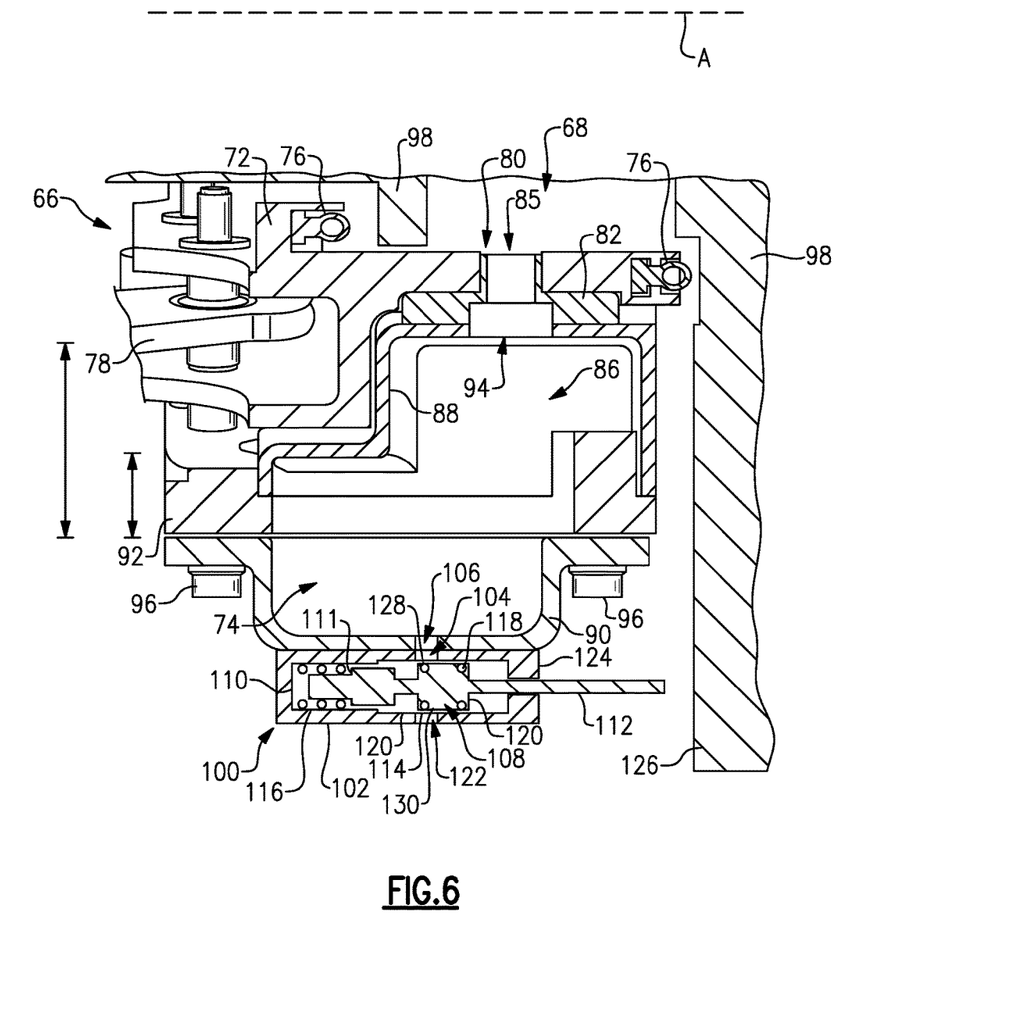
FIG. 6 shows a cross-section view of the example bleed valve in a partially open position.
Figure 7:
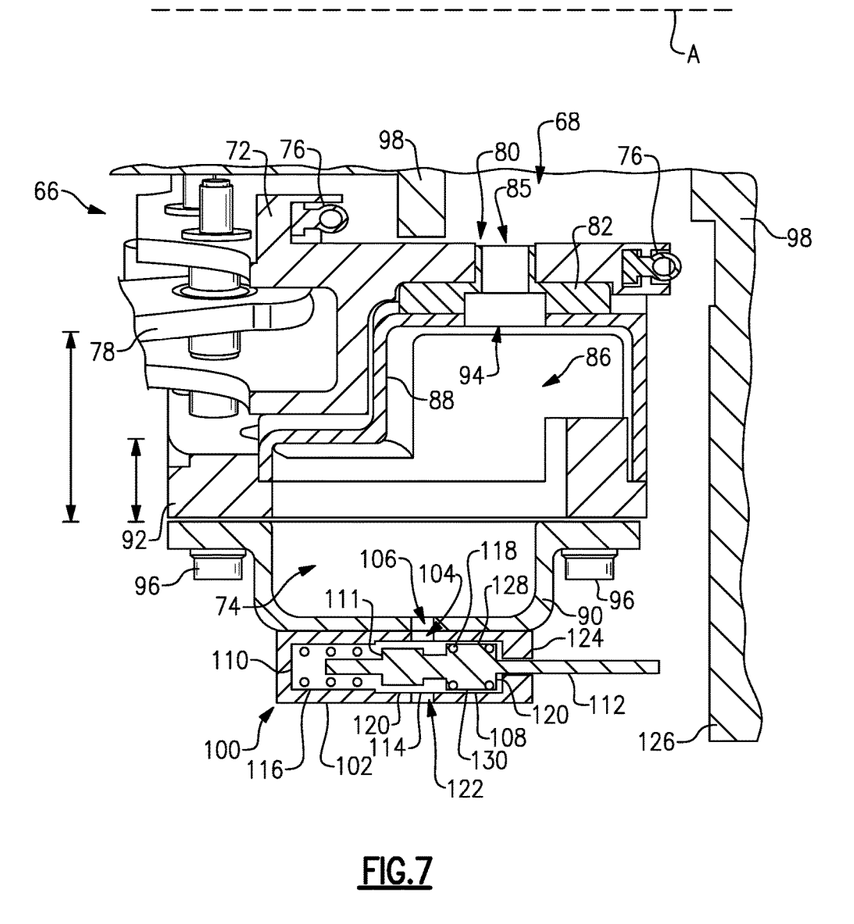
FIG. 7 shows a cross-section view of the example bleed valve in a fully open position.

As shown in FIGS. 4 and 6-7, a drain valve 100 is located on a radially outer side of the resonator 74. In the illustrated example, the drain valve 100 is a spring loaded valve, however, other types of actuated valves could be used in place of the spring loaded valve, such as a solenoid valve operated by the compressor control system 70.

In the illustrated example, the drain valve 100 includes a body portion 102, a slider 108, and a spring 116. The body portion 102 has a generally elongated cylindrical shape and is attached to the second resonator body portion 90. Although the body portion 102 is shown as a unitary piece, the body portion 102 could be formed from multiple pieces. The body portion 102 includes an inlet aperture 104 on a radially inner side that is circumferentially and axially aligned with a resonator drain opening 106 in the second resonator body portion 90.

The slider 108 is at least partially located within the body portion 102 and includes a biasing portion 110 on a first end, an engagement portion 112 on a second opposite end, and a seal portion 114 between the first end and the second end.

The biasing portion 110 is located on the first end which is toward a forward or upstream end of the slider 108. The spring 116 is located adjacent the biasing portion 110 and engages a shoulder 111 formed in the slider 108 to bias the slider 108 in the downstream or aft direction. In the illustrated example, the spring 116 is a helical spring and the biasing portion 110 of the slider 108 is generally cylindrical and extends through a central portion of the spring 116.

The seal portion 114 is located in a mid-portion of the slider 108 and has a generally cylindrical cross section with a first face 128 on a first side and a second face 130 on a second opposite side. The first face 128 includes a first O-ring 118 surrounding the inlet aperture 104 and the second face 130 includes a second O-ring 120 surrounding an exit aperture 122 in the body portion 102.

The engaging portion 112 of the slider 108 is located on the second end which is toward an aft or downstream end of the slider 108. The engaging portion 112 is attached to the seal portion 114 on a proximal end and is configured to engage a flange 126 on the low pressure compressor case 98 on a distal end. The engaging portion 112 extends through a slider aperture 124 in an aft end or downstream end of the body portion 102 to facilitate reciprocating movement through the slider aperture 124. In the illustrated example, the engaging portion 112 has a cylindrical cross section, however, the engaging portion 112 could have a rectangular or other shaped cross section. Although the slider aperture 124 does not include a seal in the illustrated example, an O-ring seal could be located in the slider aperture 124 to form a seal with the engaging portion 112.

The drain valve 100 operates in response to movement from the actuator 78. Therefore, when the bleed valve 66 is in a closed position, the drain valve 100 is also in a closed position to prevent leakage of any gases from the core flow path. Similarly, when the bleed valve 66 is in an open position, the any liquid that has collected in the resonator 74 can drain through the drain valve 100 along with a portion of the gases from the core flow path.

When the drain valve 100 and the bleed valve 66 are in a closed position, the seal portion 114 is aligned with the resonator drain opening 106 and the inlet aperture 104 to prevent leakage of any fluid from the resonator 74. Therefore, the drain valve 100 is not able to release fluid from the resonator 74 when the bleed valve 66 is closed. The engaging portion 112 of the slider 108 is also in contact with the flange 126 to fully compress the spring 116.

When the actuator 78 moves the bleed valve 66 in a forward direction to open the bleed valve 66, the slider 108 moves axially aft relative to the body portion 102 due to the biasing force from the spring 116 on the biasing portion 110. This increases the distance between the flange 126 and the body portion 102 and opens a fluid passage connecting the resonator drain opening 106 and the inlet aperture 104 with the exit aperture 122.

Similarly, when the actuator 78 moves the bleed valve 66 in a downstream or aft direction to close the bleed valve 66, the slider 108 moves axially forward relative to the body portion 102 and compresses the spring 116. This closes the fluid passage connecting the resonator drain opening 106 and the inlet aperture 104 with the exit aperture 122.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a compressor section;
   a bleed duct in communication with the compressor section; and
   a bleed valve in communication with the bleed duct comprising:
   an aperture in a valve body;
   a resonator in fluid communication with the aperture; and
   a drain valve in fluid communication with the resonator, wherein the drain valve includes a body portion at least partially surrounding a slider.

2. The gas turbine engine of claim 1, wherein the bleed valve is a 2.5 bleed valve for the gas turbine engine.

3. The gas turbine engine of claim 1, wherein the bleed valve is located adjacent an aft stage of a low pressure compressor of the compressor section.

4. The gas turbine engine of claim 1, wherein the slider is configured to move in an axial direction relative to an axis of the body portion.

5. The gas turbine engine of claim 4, further comprising a spring for biasing the slider relative to the body portion.

6. The gas turbine engine of claim 1, wherein the slider includes an engagement portion for engaging a static structure on the gas turbine engine.

7. The gas turbine engine of claim 1, wherein the slider includes a seal portion including at least one O-ring for selectively opening an aperture in the resonator.

8. The gas turbine engine of claim 1, wherein the bleed valve is located radially inward relative to an axis of rotation of the gas turbine engine from the resonator.

9. The gas turbine engine of claim 1, wherein the slider is configured to slidably engage an inner surface of the body portion.

* * * * *